(12) United States Patent
Quartier et al.

(10) Patent No.: US 9,275,618 B2
(45) Date of Patent: Mar. 1, 2016

(54) HAPTIC CONTROLLER SUITABLE FOR CONTROLLING A SOUND CHARACTERISTIC

(71) Applicants: UNIVERSITE PIERRE ET MARIE CURIE (PARIS 6), Paris (FR); CENTRE NATIONAL DE LA RECHERCHE SCIENTIFIQUE, Paris (FR)

(72) Inventors: Laurent Quartier, Paris (FR); Eric Simon, Marigny (FR)

(73) Assignees: UNIVERSITE PIERRE ET MARIE CURIE (PARIS 6), Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/435,599

(22) PCT Filed: Oct. 15, 2013

(86) PCT No.: PCT/EP2013/071547
§ 371 (c)(1),
(2) Date: Apr. 14, 2015

(87) PCT Pub. No.: WO2014/060428
PCT Pub. Date: Apr. 24, 2014

(65) Prior Publication Data
US 2015/0302841 A1    Oct. 22, 2015

(30) Foreign Application Priority Data

Oct. 15, 2012   (FR) ...................................... 12 59831

(51) Int. Cl.
*G10H 1/00* (2006.01)
*G10H 1/34* (2006.01)
*G06F 3/01* (2006.01)

(52) U.S. Cl.
CPC .................. *G10H 1/34* (2013.01); *G06F 3/016* (2013.01); *G10H 1/346* (2013.01); *G10H 1/348* (2013.01)

(58) Field of Classification Search
CPC ..... G06F 3/016; G06F 3/0346; G06F 3/0354; G06F 3/0219; G06F 2203/04102; G06F 3/0414; G10H 1/34; G10H 1/346; G10H 1/348; G01L 1/16; G10K 2210/3219; B25J 9/041

See application file for complete search history.

(56) References Cited

U.S. PATENT DOCUMENTS

| 3,045,522 A | 7/1962 | Markowitz et al. |
| 3,558,793 A | 1/1971 | Nakada et al. |

(Continued)

FOREIGN PATENT DOCUMENTS

| GB | 1 573 233 A | 8/1980 |
| JP | 52-154230 U | 11/1977 |

(Continued)

OTHER PUBLICATIONS

International Search Report for PCT/EP2013/071547 dated Mar. 20, 2014.

*Primary Examiner* — Marlon Fletcher
(74) *Attorney, Agent, or Firm* — Sughrue Mion, PLLC

(57) ABSTRACT

The invention relates to a haptic controller comprising a base (2), at least one maneuvering body (8) which is movably mounted on the base such that it can be moved under the action of a user, mechanical connection means (4, 15) comprising at least one deformable abutment consisting of an elastomer material between the maneuvering body and the base, and suitable for exerting a monotonous, non-linear resistive effort against an actuating effort of the maneuvering body, at least one sensor (12) placed in the haptic controller in such a way as to generate a signal representative of said actuating effort, and associated built-in or remote means (18) for processing the signal generated by the sensor, in order to supply an output signal for controlling at least one characteristic of a sound.

14 Claims, 4 Drawing Sheets

(56) References Cited

U.S. PATENT DOCUMENTS

| | | |
|---|---|---|
| 4,351,222 A | 9/1982 | Kumano |
| 6,420,642 B1 * | 7/2002 | Muramatsu ............... G10F 1/02 250/227.22 |
| 7,045,701 B1 | 5/2006 | Walker et al. |
| 2001/0047713 A1 * | 12/2001 | Muramatsu ............... G10F 1/02 84/3 |
| 2005/0160903 A1 | 7/2005 | Nagaoka et al. |
| 2008/0141847 A1 | 6/2008 | Komatsu et al. |
| 2010/0175545 A1 | 7/2010 | Muramatsu |
| 2011/0061518 A1 | 3/2011 | Iwamoto et al. |
| 2015/0286295 A1 * | 10/2015 | Pepe .................... G06F 3/0362 345/163 |

FOREIGN PATENT DOCUMENTS

| | | |
|---|---|---|
| JP | 04-350967 A | 12/1992 |
| JP | 06-175649 A | 6/1994 |
| JP | 2009-236967 A | 10/2009 |

\* cited by examiner

HAPTIC CONTROLLER SUITABLE FOR CONTROLLING A SOUND CHARACTERISTIC

CROSS REFERENCE TO RELATED APPLICATIONS

This application is a National Stage of International Application No. PCT/EP2013/071547 filed Oct. 15, 2013, claiming priority based on French Patent Application No. 12 59831, filed Oct. 15, 2012, the contents of all of which are incorporated herein by reference in their entirety.

The invention relates to a haptic controller having a maneuverable component that can be maneuvered by the user, for example a key that can be pressed by a finger, which can be used notably for controlling at least one sound characteristic of a musical instrument.

BACKGROUND TO THE INVENTION

On synthesizers or any other electronic device for generating sound, it is commonplace to have one or more haptic controllers to allow the instrumentalist to control various characteristics of the generated sound, such as its volume, its vibrato, its dynamics, etc.

By way of example, the volume pedals of organs with electromechanical wheels are known, or else the volume pedal branded BOSS EV5 with a MIDI interface that can be linked to a synthesizer. In general, these pedals or haptic foot controllers are provided with a potentiometer, the output of which is digitized in order to generate a signal that is proportional to the depression of the pedal.

On instruments of ondes Martenot type, a key called the intensity key or expression key can be found that allows the volume of the sound generated by the instrument to be controlled. In a manner known per se, the key is mounted as a lever so that pressing the key causes a bag of conductive powder to be crushed that conveys the electrical signal carrying the sound. The crushing of the bag causes the resistivity of the powder to be modified and, consequently, the amplitude of the sound to be modified. The use of such a bag allows a relationship between the force applied to the key and the amplitude of the sound that is very close to the psycho-physiological perception of the musician.

However, such an achievement is tricky to implement, and it appears that the bag of powder is difficult to reproduce and complex to implement in practice. Moreover, this device is solely analog and is not suited to use as a haptic controller for modern instruments.

OBJECT OF THE INVENTION

The object of the invention is to propose a haptic controller that allows control finesse while allowing use with modern equipment, such as a MIDI sequencer, a piece of computer assisted music software or else a digital controller for video editing.

Presentation of the Invention

To this end, the applicant proposes a haptic controller having:
a base,
at least one maneuverable component mounted so as to be able to move on the base in order to be able to be moved under the action of a user,
mechanical connecting means having at least one deformable stop made of elastomeric material that are disposed between the maneuverable component and the base and suited to exerting a monotonous nonlinear resistive force counter to an actuating force from the maneuverable component,
at least one sensor placed in the haptic controller so as to generate a signal which is representative of said actuating force,
operationally linked processing means for the signal generated by the sensor, which are integrated or remote in relation to the controller, in order to deliver an output signal for controlling at least one characteristic of a sound.

The monotonous nonlinear nature of the resistive force is aimed at improving the sensory perception of the user when the maneuverable component is manipulated. Thus, the user feels a nonlinearly increasing resistive force in accordance with a physiological feeling, thus allowing precise control of the sound characteristic. The generation of the signal and the processing thereof enable the haptic controller to be interfaced with a sound generator. The output signal can then be used to control a volume, a distortion, a vibrato or any other characteristic of the sound.

The processing means can be physically integrated into the haptic controller so as to define an autonomous haptic controller, which is advantageously provided with means for interfacing to an external piece of equipment, such as a MIDI sequencer or a synthesizer, in order to provide the output signal. The processing means can alternatively be relocated to an external control unit, for example to the musical instrument to which the haptic controller of the invention is connected. By way of example, the sensor can be a force sensor that is placed so as to be sensitive to the maneuvering force, or else a position sensor that translates the movement of the maneuverable component. This movement will then be converted, at the processing means placed inside the device, or relocated, into a force applied to the maneuverable component.

It is, of course, evident that the reference here to nonlinear force is aimed at nonlinear forces developed during a portion of the operational travel of the maneuverable component, rather than when the maneuverable component has come to a stop at the end of its travel.

According to a particular embodiment, the maneuverable component is a key that can be pressed by the finger of the user.

Preferably, then, the mechanical connecting means comprise firstly a flexible strip having a first end embedded in the base and a second end carrying the key, and secondly a deformable stop against which the key comes to a stop when it is pressed.

PRESENTATION OF THE FIGURES

The invention will be better understood upon reading the description of particular embodiments of the invention below, with reference to the figures of the appended drawings, in which.

DETAILED DESCRIPTION OF EMBODIMENTS OF THE INVENTION

Figure 1:
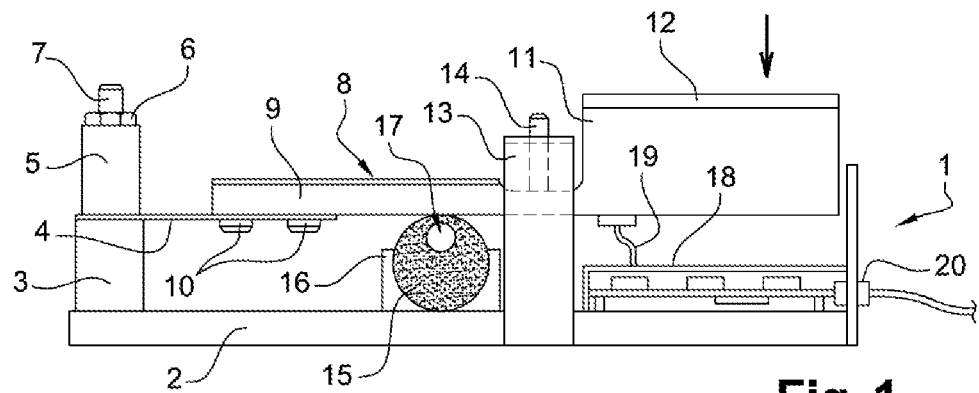
FIG. 1 is a side view of a haptic controller according to a first particular embodiment of the invention, in which the maneuverable component is a key.
Figure 2:
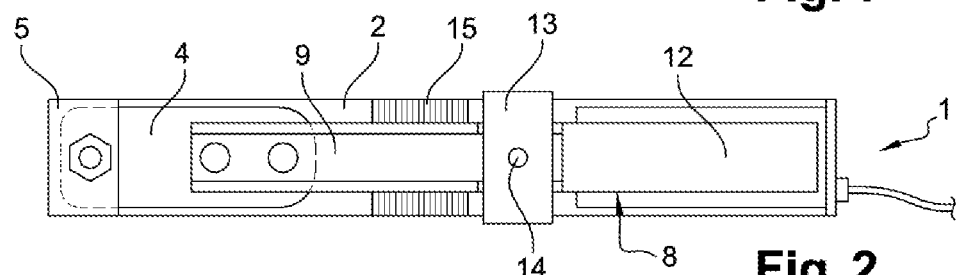
FIG. 2 is a top view of the haptic controller from FIG. 1.

According to a first particular embodiment, and with reference to FIGS. 1 and 2, the haptic controller 1 has a base 2 to which a support 3 is fixed. A flexible strip 4 (for example a metal strip) has one end sandwiched between the support 3 and a flange 5 that is attached to the support 3 and tightened by means of a nut 6 attached to a tightened screw 7. Attached to the other end of the flexible strip 4 is a maneuverable component, in this case a key 8 exhibiting a tail 9 that is fixed to the flexible strip 4 by means of screws 10. The tail 9 of the key 8 is connected to a body 11 that can be manipulated directly by the user by using his finger to exert on said body a depressive force in accordance with the arrow in the figure. Such a force prompts the key to move downward, causing the flexible strip 4 to bend, producing a force that resists the movement of the key 8.

In this case, a force sensor 12 is placed on the upper portion of the body 11 of the key 8 so as to be directly sensitive to the force exerted by the user. Quite evidently, the invention is not limited to the use of such a force sensor. It is also possible to use a position sensor, the signal from which is conditioned in relation to the haptic feedback produced by the deformation of the stop during depression. The sensor is disposed so as to be sensitive either to the exerted force or to the movement of the maneuverable component.

The tail 9 extends through a hoop 13 provided with an adjustable stop screw 14 that acts on the tail 9 in order to limit the upward travel of the key 8.

Figure 6:
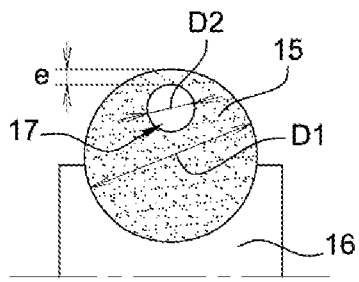
FIG. 6 is an end view of the deformable stop of the controller from FIG. 1.

Moreover, a deformable stop 15 (made of deformable material, such as an elastomeric material, for example) is received in a support 16 that is integral with the base 2 in order to extend beneath the tail 9 of the key 8 so as to be deformed by the movement of the key 8 under the action of the user, and so as to exert a force that resists the movement of the key 8. In this way, the key 8 can be pressed by the user counter to a resistive force resulting from the action of the flexible strip 4 and of the deformable stop 15. More precisely, and as illustrated in detail in FIG. 6, the deformable stop 15 is in this case in the shape of a circular cylindrical section of diameter D1 in which a bore 17 of diameter D2 has been made parallel to the central axis of the cylinder, but offset (that is to say not coaxial) so as to leave a gap e between the outer surface of the circular cylinder and the bore. This bore provides the resistive force exerted by the stop with a particularly useful monotonous nonlinear nature. It is evident that the three parameters D1, D2 and e can be adjusted in order to modify the response of the deformable stop to being crushed by the key.

By way of example, if a key on the keyboard of the synthesizer is involved, this deformable stop advantageously exhibits an external diameter D1 of no more than 50 millimeters, a bore with a maximum internal diameter D2 of 30 millimeters, the bore being offset so as to exhibit a gap e of no more than 5 millimeters from the edge of the cylinder. It is obvious that the offset mentioned here goes beyond simple manufacturing tolerances that would affect a coaxially bored cylinder. The deformable stop in the form of a bored cylinder is just one exemplary embodiment of the stop made of elastomeric material. The deformable stop may be of another shape, with or without a bore, such as rectangular, ogival, domed, square, triangular, Z-shaped or in any other shape that can be realized since it produces a nonlinear resistive force. Equally, any type of elastomeric material can be used, such as a polyurethane-based elastomeric molding, for example.

It will be noted that the force exerted by the user is substantially equal to the resistive force, the inertia of the key 8 being very low. Thus, the resistive force to which the key 8 is subjected when it is pressed constitutes haptic feedback for the user. The signal generated by the sensor 12 is then supplied to a processing unit 18 that receives the signal from the sensor via a wire connection 19, conditions it and sends it to an output 20 (for example of MIDI output type). It will be noted that the signal from the sensor is conditioned in relation to the haptic feedback produced by the deformation of the stop during depression. Preferably, the processing unit has an analog/digital converter, one or more programmable microcontrollers allowing the processing of the signal to be parameterized, a nonvolatile memory containing the prerecorded programs for transforming the digitized signals from the sensor, and the type of MIDI control to which they are assigned, a USB input/output to allow the programs to be implemented in the nonvolatile memory.

Thus, the haptic controller is capable of talking in MIDI language and being interfaced with any piece of equipment that is suited to managing this language, such as a synthesizer, and it is, of course, possible to assign it to the control of any parameter.

Figure 3:
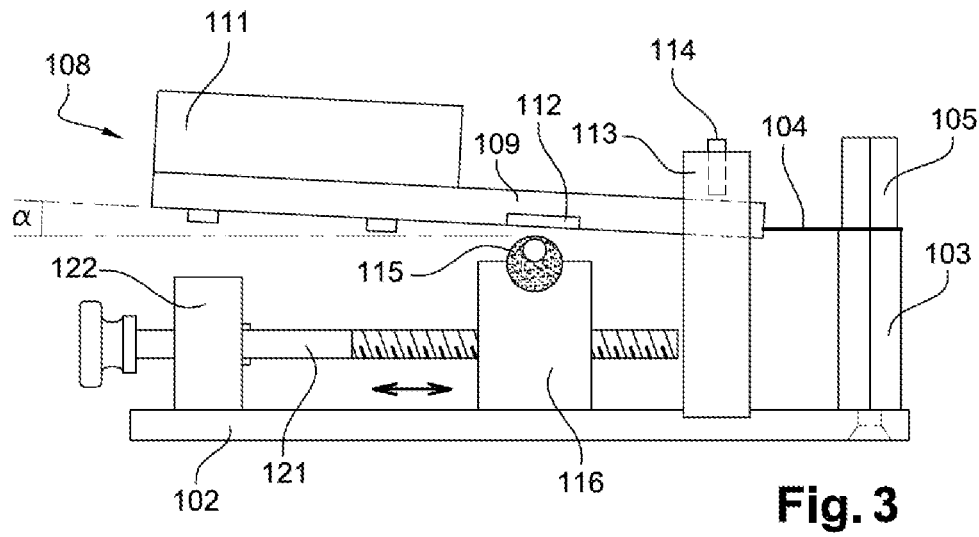
FIG. 3 is a side view of a haptic controller according to a second particular embodiment of the invention, the electronics not being shown.

According to a second particular embodiment that is shown in FIG. 3, in which the references for those elements that are in common with FIGS. 1 and 2 have been augmented by 100, the deformable stop 115 is held on a support 116 that is mounted so as to be able to move axially (according to the double-headed arrow in the figure). The support 116 has an internal thread that has an adjusting screw 121 engaging in it that is mounted so as to rotate on a bearing 122 that is integral with the base 102. It suffices to turn the screw in order to axially move the support 116 and therefore the deformable stop 115, and thus to modify the point at which the key 108 is alongside the deformable stop 115. This allows adjustment of the relationship between the depression of the key 108 and the resistive force to which the latter is subjected. In this case, the force sensor 112 has been placed on the key opposite the deformable stop.

In practice, the key 108 will typically be provided with a travel of a few millimeters, ensuring that the resistive force remains reasonable, with a maximum in the order of a few newtons.

Figure 5:
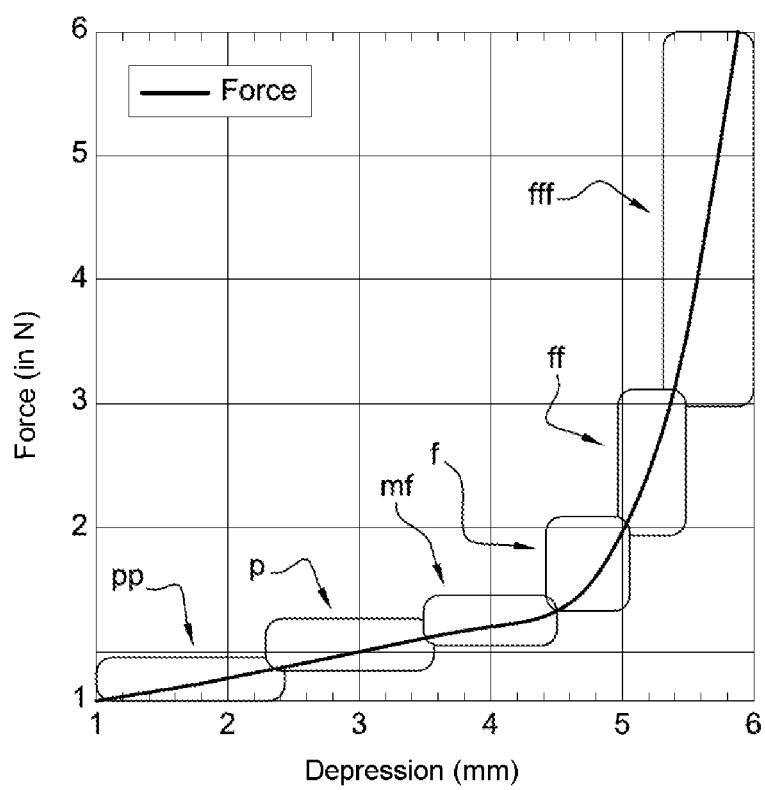
FIG. 5 is a graph showing the resistive force exerted by the mechanical connecting means as a function of the depression of the key of the haptic controller from FIG. 3.

FIG. 5 reveals the typical appearance of the resistive force to which the key 108 of the haptic controller 101 is subjected when it is pressed. The values provided below are merely indicative. The person skilled in the art will easily understand that the general appearance of the curve and the corresponding values of depression and force can vary within wide proportions according to the kinematics of the key, the position of the deformable stop, the stiffness of the strip and of the deformable stop, etc.

Over a first range A corresponding to the first few millimeters of depression (in this case more or less [0-1] mm), the force is insignificant and has not been shown. Then, over a second range B (in this case more or less [1-4.5] mm), the key has not yet touched the deformable stop, such that the only resistive force results from the flexible strip. This force is substantially linear and exhibits a slight slope. Next, at the start of a third range C (in this case more or less [4.5-6] mm), the key draws alongside the deformable stop. The latter will therefore start to develop a resistive force that is superimposed on that of the strip in order to give the force curve an increasingly sizable slope, with considerable stiffening in the range from 5 to 6 millimeters. It will be noted that the shape of the curve is evocative of a logarithmic variation in the depression E with the resistive force F.

This device is designed to reproduce the force/depression curve typical of a human finger, pressing on a planar surface. Thus, a novice can master this controller immediately, since doing so does not require new gestures to be learned. The user intuitively possesses the level of control finesse required, allowing sharp musical use.

On the other hand, this monotonous nonlinear increase in the resistive force allows considerable control finesse, owing to the measures that are now set out. The Weber-Fechner (or Bouguer-Weber) law describes the relationship between the sensation felt and the physical magnitude of a stimulus. According to this law, the sensation S detected varies for the intensity I of the stimulus according to the relationship S∂log (I).

Thus, if there is a desire for fine control of the sensation of the user (for example the sound level of the emitted sound expressed in dB) relative to the stimulus (in this case the force that resists the depression of the key), it is then advisable to anticipate digital processing of the signal from the sensor that allows the variation in intensity of the sound signal (sound dynamics) to be connected to the force according to the relationship ΔdB=k. log (F), where k is a constant. For this, the output signal from the haptic controller of the invention, $S_{out}$, will be made proportional to the logarithm of the force. The role of the processing unit 18, 118 is merely to ensure the generation of an output signal $S_{out}$ that is proportional to the logarithm of the resistive force.

It is likewise possible to use force sensors that generate a signal that is directly proportional to the logarithm of the force that is detected, such as force sensors of FSR type, for example.

Thus, the user has an intuitive physiological perception of the ratio between the actuating force that he applies to the key and the sound dynamics, which allows very fine control of the sound dynamics. FIG. 5 shows the various volume ranges that can be controlled by virtue of the haptic controller of the invention, from pianissimo to fortississimo. Preferably, the ranges with a low sound level correspond to a depression range that is more sizable than the ranges of high sound level. To further improve the sensitivity linked to the depression of the key, and according to a particular aspect of the invention, a sigmoidal transform is applied to the logarithm of the force, that is to say that the following transformation is used:

$$Sout \approx \frac{A}{1 + \exp\{-\lambda \times (\log(F) - x_0)\}}$$

where A, λ, and $x_0$ are parameters of the sigmoid that are preferably chosen such that:

the useful range of the signal, which represents the major portion of the curve (centered around the point of inflection at $x_0$) extends along an oblique line, and therefore allows the proportionality relationship between ΔdB and log(F). In particular, it is possible to act on the slope of the proportionality relationship (the slope is λ/4): there is thus a simple means available for adjusting the sensitivity curve for the key;

the range corresponding to slight forces and extending along a horizontal asymptote allows adjustment of the minimum level of force to trigger the effect of the key;

the range corresponding to strong forces and extending along a horizontal asymptote simply corresponds to the fact that muscular abilities are limited.

Thus, the sound dynamics are felt even better by the user. Such a transformation is merely optional, however. It is equally possible to use other types of transformations improving sensitivity, which are suited to the particular shape of the relationship between the depression and the force.

Figure 4:
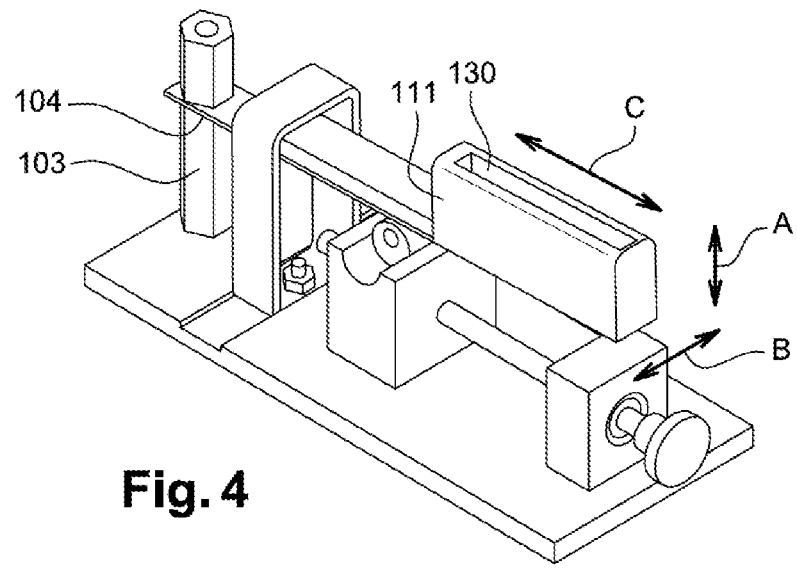
FIG. 4 is a perspective view of a variant of the haptic controller from FIG. 3, illustrating the three uses of the key that are able to be detected and exploited.

The invention is, of course, open to a large number of variants. By way of example, with reference to FIG. 4, which shows a haptic controller similar to that in FIG. 3, it has been anticipated not only that the key will be pressed according to the arrow A but also that the key is able to move laterally according to the arrow B. This lateral mobility can be obtained in various ways. By way of example, it is possible to select a flexible strip 104 that is liable to warp slightly on one side or the other when lateral pressure is applied to the top of the body 111, so as to allow a lateral movement (accompanied by slight rotation of the key). There may also be provision for the support 103 and the flexible strip 104 to have a pivoting connection between them that allows lateral movement of the key 108. In order to detect these lateral movements, it will suffice to provide, on the haptic controller, a first additional sensor that is sensitive to the lateral movement and that generates a signal that is representative of this lateral movement. By way of example, it may be an inductive sensor that is sensitive to the movement of a target mounted on the key. This provides a second control that can be controlled by the finger that presses the key.

In the same way, it is possible to provide for the top of the body to have a second additional sensor mounted on it, in this case a band 130 that is sensitive to the movement of the finger according to the arrow C along the body 111 of the key 108 and that generates a signal that is representative of the position of the finger on the body, which provides a third control on the key, which can still be controlled using the finger that presses the key.

On a haptic controller of this kind, it will then be possible to distinguish
  the depression and therefore the force with which the musician presses the key
  the lateral movement and/or the force that the musician applies in order to prompt a lateral movement
  the position of the finger on the key.

Thus, a keyed haptic controller of this kind allows fine control of a plurality of parameters with a single action by the finger on the key, such as the sound dynamics of the sound, the level thereof and the spectral content thereof, for example.

A haptic controller of this kind can be used as it is by being interfaced with a sound generator in order to control one or more sound parameters. It can also be integrated in various equipment, such as a mixing desk, for example, by replacing a linear or rotary potentiometer control.

The haptic controller of the invention can likewise be equipped with a storage pushbutton that is intended to allow the musician to temporarily free his hand while maintaining the desired effect. The pushbutton is interfaced with the processing means in order to keep the output signal at the level that it had at the moment at which the pushbutton was pressed. The program assigned to managing the signal from the sensor contains a loop for the on/off state of a pushbutton (situated preferably on the housing of the haptic controller, so that the musician can actuate it using a finger other than the one that acts on the key). At the instant at which the pushbutton is triggered, the program toggles to an interrupt mode: it keeps the last value from the sensor in memory, which allows the musician to remove his finger from the key and to free his hand without the sound being harshly affected (no zeroing of the volume). When the program detects that the key is subjected to the same force value again, it resumes its normal mode of operation.

Of course, the invention applies to controllers in which the maneuverable component is different than a key.

Figure 7:
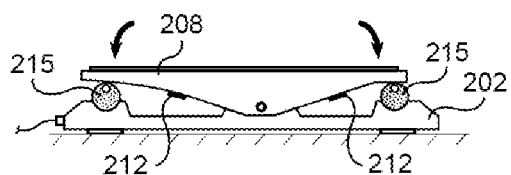
FIGS. 7 to 10 are side views of haptic controllers according to the invention in which the maneuverable component is a pedal.
Figure 8:
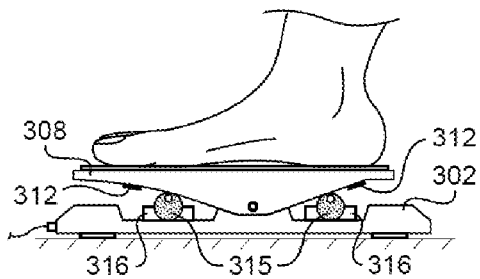
Figure 9:
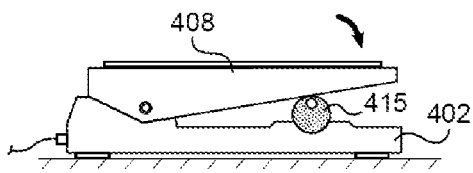
Figure 10:
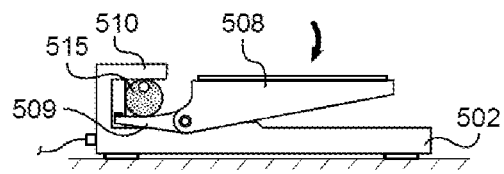
Figure 11:
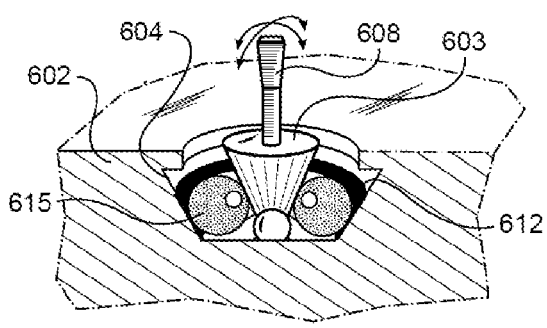
FIGS. 11 and 12 are perspective sectional and top views of haptic controllers according to the invention in which the maneuverable component is a joystick.

FIGS. 7 to 10 illustrate haptic controllers in which the maneuverable component is a pedal that can be actuated with the foot. In FIG. 7, the base 202 has a maneuverable component articulated on it in the form of a pedal 208. The mechanical connecting means in this case comprise two deformable stops 215 that, as previously, take the form of cylinders with an offset bore made of elastomeric material that are disposed on either side of a pin articulating the pedal to the base in order to oppose nonlinear resistive forces in two directions of maneuver of the pedal. The sensors used in this case are position sensors 212 measuring the angular position of the pedal 208. FIG. 8 again shows the pedal 308 articulated to the base 302, as well as the two deformable elastomeric stops 315, which in this case are mounted on carriages 316 with an adjustable position, in order to adjust the resistive force that is opposed by the deformable stops when the pedal is maneuvered. The position sensors 312 can again be seen. In FIG. 9, the pedal 408 is articulated to the base 402. In this case, the haptic controller has only a single deformable stop 415, the pedal 408 being maneuverable only in a single direction. Finally, FIG. 10 illustrates a haptic controller in which the pedal 508 is still articulated to the base 502. However, the pedal 508 has a paddle 509 that extends beyond the articulated pin of the pedal 508 in order to cooperate with a deformable stop 515 that comes to bear against an edge 510 that is integral with the base 502.

Figure 12:
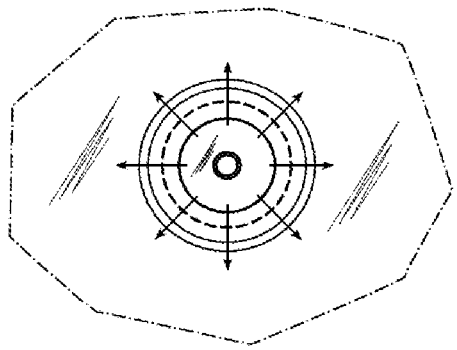

The invention also applies to haptic controllers in which the maneuverable component is a joystick 608. The joystick is swivel-jointed to a base 602 by being terminated with a conical footing 603. The deformable stop 615 made of elastomeric material is in this case in the form of a torroid with an offset bore, which can be obtained by forming a cylinder with an offset bore and which extends into a conical cavity 604 hollowed out in the base 602 in order to cooperate with the cone 603. In FIG. 12, it can be seen that the joystick 608 can be moved in all radial directions and is subjected to a similar resistive force for each direction. A sensitive sensor 612 in the form of a conical layer is disposed against the wall of the cavity 604 so as to be sensitive to the maneuvering force imparted to the joystick 608, whatever the radial direction of the force.

Figure 13:
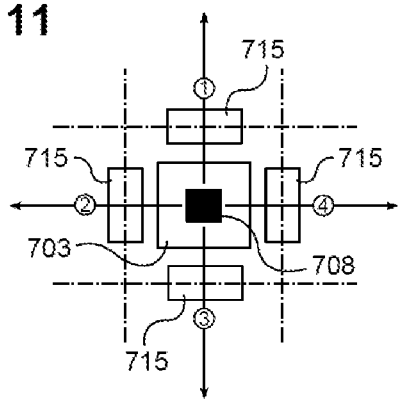
FIG. 13 is a schematic view of a haptic controller according to the invention in which the maneuverable component is a joystick.

In FIG. 13, in a top view and according to a variant embodiment, the joystick 708 is now linked to a pyramidal footing 703 that cooperates with four deformable stops 715 disposed in twos in order to resist maneuvering forces along two perpendicular axes.

Figure 14:
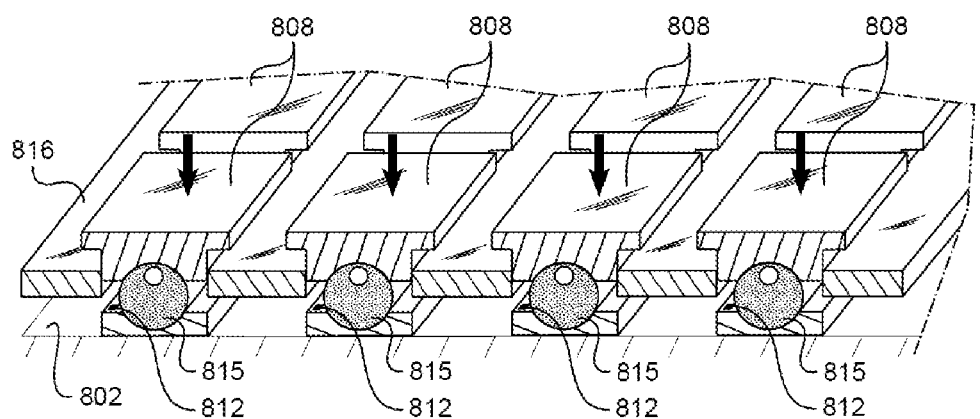
FIG. 14 is a perspective sectional view of a haptic controller according to the invention having a plurality of maneuverable components forming a keyboard.

In FIG. 14, the haptic controller according to the invention has a plurality of maneuverable components in the form of keys 808 that are disposed in order to form a keyboard. The keys are positioned and guided by a mask 816. Deformable stops made of elastomeric material 808 extend between each of the keys 815 and a base 802. Sensors 812 extend close to the deformable stops 815.

Figure 15:
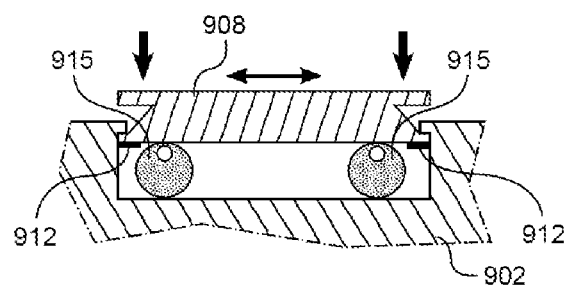
FIGS. 15 and 16 are side and perspective views of a haptic controller according to the invention having a plurality of maneuverable components in the form of adjacent keys.
Figure 16:
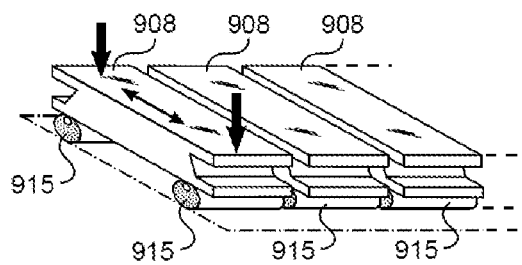

Finally, FIGS. 15 and 16 illustrate another haptic controller according to the invention that has a plurality of maneuverable components in the form of juxtaposed keys 908 that cooperate with deformable stops made of elastomeric material, which in this case are in the form of cylinders with offset bores 915. Sensors 912 extend close to the deformable stops 915 so as to be sensitive to maneuvering forces exerted on either side of each key 908 (as indicated by the arrows).

In all the illustrated examples, the deformable stops generate a nonlinear resistive force counter to an actuating force from the maneuverable component.

The invention is, of course, not limited to what has just been described, but encompasses any variant that falls within the scope defined by the claims.

In particular, although haptic controllers equipped with a force sensor have been illustrated here, any other sensor can be used, since it delivers a signal that is representative of the force applied to the maneuverable component. In particular, it is possible to use a position sensor from which the signal is calibrated to establish correspondence between the controller position and the corresponding resistive force, for example by means of a table, or by means of a programmed law. If need be, the sensor will be equipped with the electronics suited to translating these findings into force applied to the maneuverable component. Moreover, it is possible to use a deformation sensor (strain gauge) or even a pressure sensor.

Although the mechanical connecting means between the key and the base in this case comprise a metal strip and a deformable stop in the form of a cylinder with an offset bore (if necessary shaped to form a torroid), it is possible to use other mechanical connecting means having a deformable stop made of elastomeric material, since these generate a resistive force for the actuation of the maneuverable component that is nonlinear and monotonous, preferably having at least approximately a logarithmic appearance.

Although the processing means in the examples illustrated are physically incorporated in the haptic controller of the invention, these processing means will more generally be able to be operationally linked to the haptic controller without, however, being physically integrated therein. By way of example, it is possible to use a series of haptic controllers according to the invention that are disposed in order to constitute a keyboard. The processing means will then be advantageously grouped into a processing unit that will then be common to all the keys.

Finally, there may be an operating play between the maneuverable component and the deformable stop such that the deformable stop plays its part only after the maneuverable component has drawn alongside the deformable stop, as in the examples illustrated in FIGS. 1 to 4. However, the deformable stop can likewise be disposed so as to be permanently bearing against the maneuverable component.

The invention claimed is:

1. A haptic controller having
   a base,
   at least one maneuverable component mounted so as to be able to move on the base in order to be able to be moved under the action of a user,
   mechanical connecting means having at least one deformable stop in the form of a circular cylindrical section made of elastomeric material, a bore that is parallel to a central axis of the cylinder but offset being made in said cylinder, said connecting means extending between the maneuverable component and the base and are suited to exerting a monotonous nonlinear resistive force counter to an actuating force from the maneuverable component, said deformable stop having an external diameter of less than or equal to 50 millimeters, the bore having a diameter of less than or equal to 30 millimeters, leaving a gap between an outer surface of the stop and the bore of less than or equal to 5 millimeters,
   at least one sensor placed in the haptic controller so as to generate a signal which is representative of said actuating force, and
   operationally linked processing means for the signal generated by the sensor in order to deliver an output signal for controlling at least one characteristic of a sound.

2. The haptic controller as claimed in claim 1, in which the maneuverable component is a key that is pressed under the action of a finger of the user.

3. The haptic controller as claimed in claim 2, in which the mechanical connecting means have a flexible strip having a first end that is immobilized relative to the base and a second end that is connected to the key, as well as the deformable stop disposed so as to come into contact with the key when it is pressed.

4. The haptic controller as claimed in claim 1, in which the deformable stop is mounted on a support that is mounted so as to be able to move on the base so as to be able to modify the action of the deformable stop on the maneuverable component.

5. The haptic controller as claimed in claim 1, in which the mechanical connecting means generate a resistive force that progresses with the actuation so as to exhibit a first portion with a negligible resistive force (A) followed by a portion with a slight slope (B) and then, after the deformable stop has been reached alongside, a portion whose slope increases until it exhibits a sizable slope (C).

6. The haptic controller as claimed in claim 1, in which the processing means and/or the sensor generate an output signal ($S_{out}$) that is substantially proportional to the logarithm of the force applied to the maneuverable component, at least in a useful range of the signal.

7. The haptic controller as claimed in claim 2, having at least one additional sensor that generates a signal that is representative of an action on the key other than pressing.

8. The haptic controller as claimed in claim 7, in which the signals from the sensor and from the additional sensor are used in order to deliver at least two output signals that allow the control of two characteristics of a sound.

9. The haptic controller as claimed in claim 8, in which the mechanical connecting means authorize a lateral movement (B) of the key in relation to the base, a first additional sensor generating a signal that is representative of this lateral movement.

10. The haptic controller as claimed in claim 9, in which the mechanical connecting means authorize, moreover, a sliding movement (C) by the finger along the maneuverable component, a second additional sensor generating a signal that is representative of the position of the finger along the key.

11. The haptic controller as claimed in claim 9, in which the signals from the sensor and from the two additional sensors are used in order to control three sound characteristics.

12. The haptic controller as claimed in claim 1, in which the maneuverable component is a pedal that can be maneuvered with the foot.

13. The haptic controller as claimed in claim 12, having two deformable stops that are disposed on either side of a pin articulating the pedal to the base in order to oppose nonlinear resistive forces in two directions of maneuver of the pedal.

14. The haptic controller as claimed in claim 1, in which the maneuverable component is a joystick swivel-jointed to the base, the deformable stop comprising a toroidally shaped roll extending between the base and a footing of the joystick.

* * * * *